Figure 4:
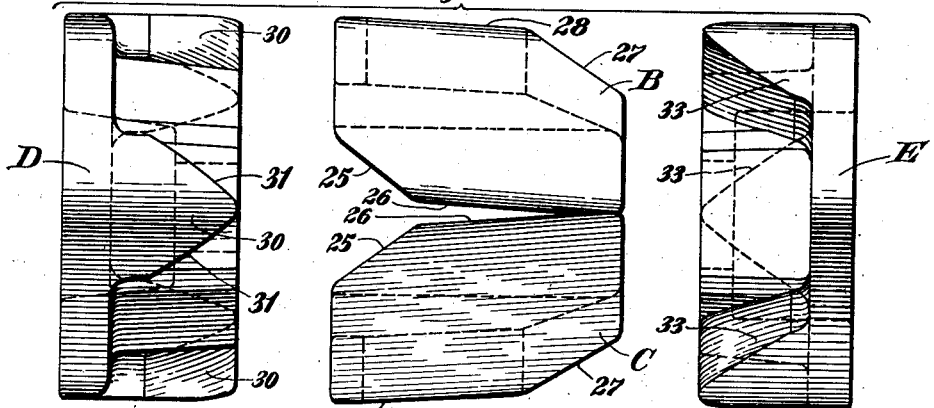

Feb. 17, 1942.  S. B. HASELTINE  2,273,192
FRICTION SHOCK ABSORBING MECHANISM
Filed March 8, 1940  4 Sheets-Sheet 1
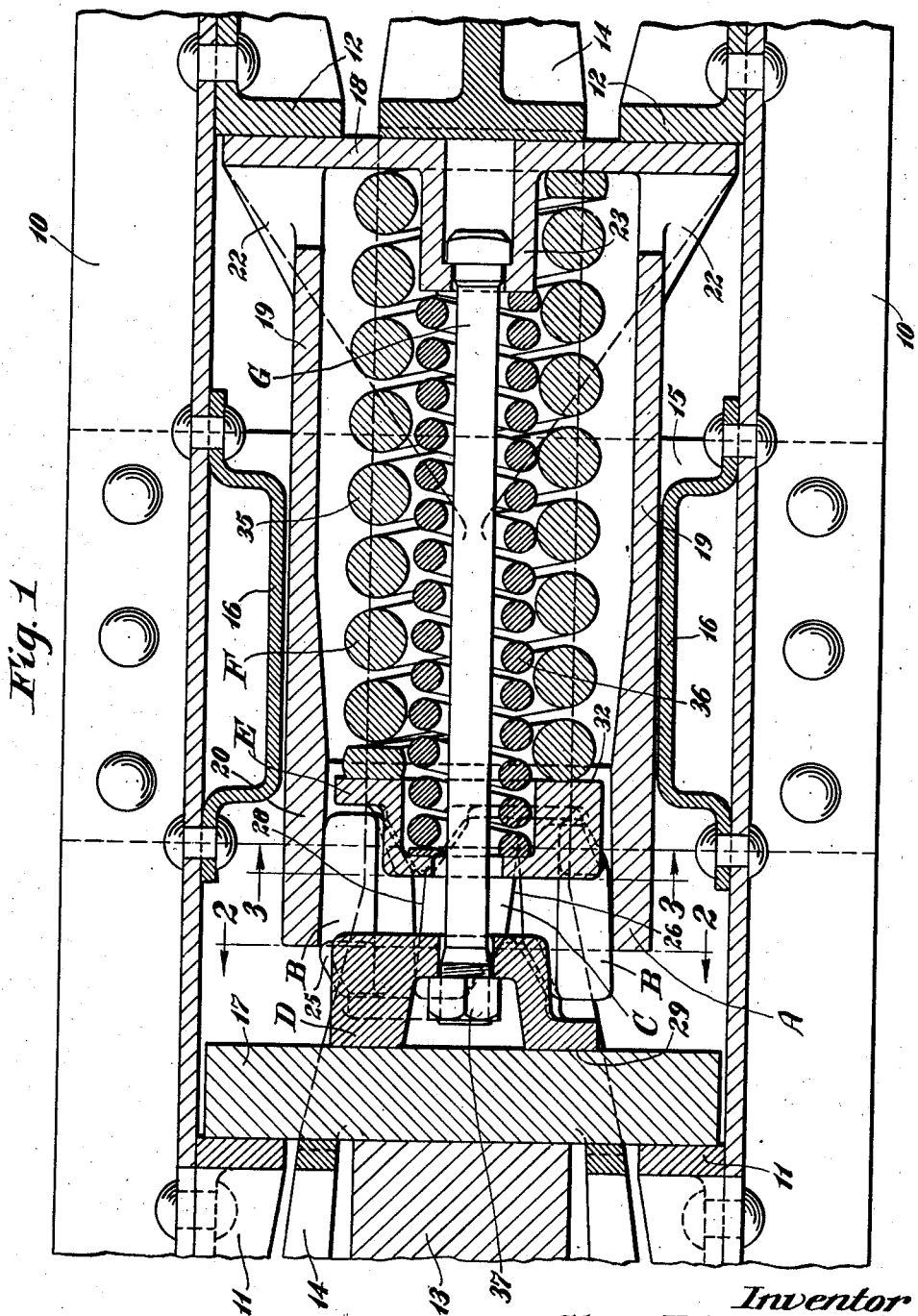
Inventor
Stacy B. Haseltine
By Henry Fuchs
Atty.

Feb. 17, 1942.  S. B. HASELTINE  2,273,192
FRICTION SHOCK ABSORBING MECHANISM
Filed March 8, 1940  4 Sheets-Sheet 2
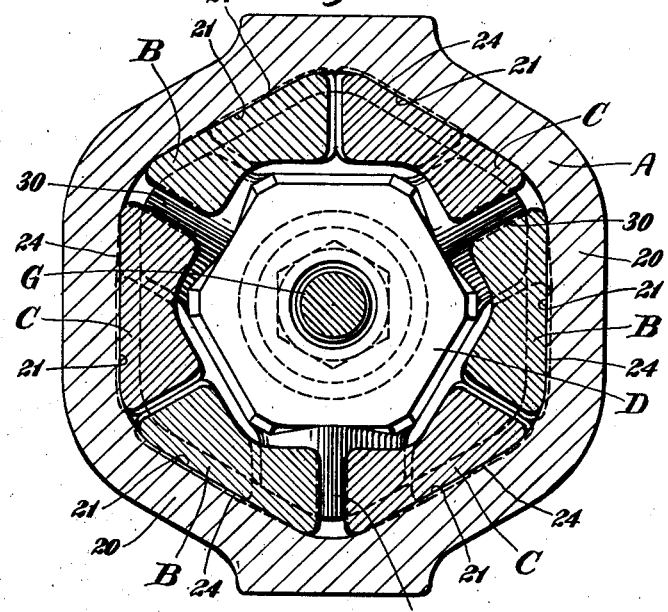
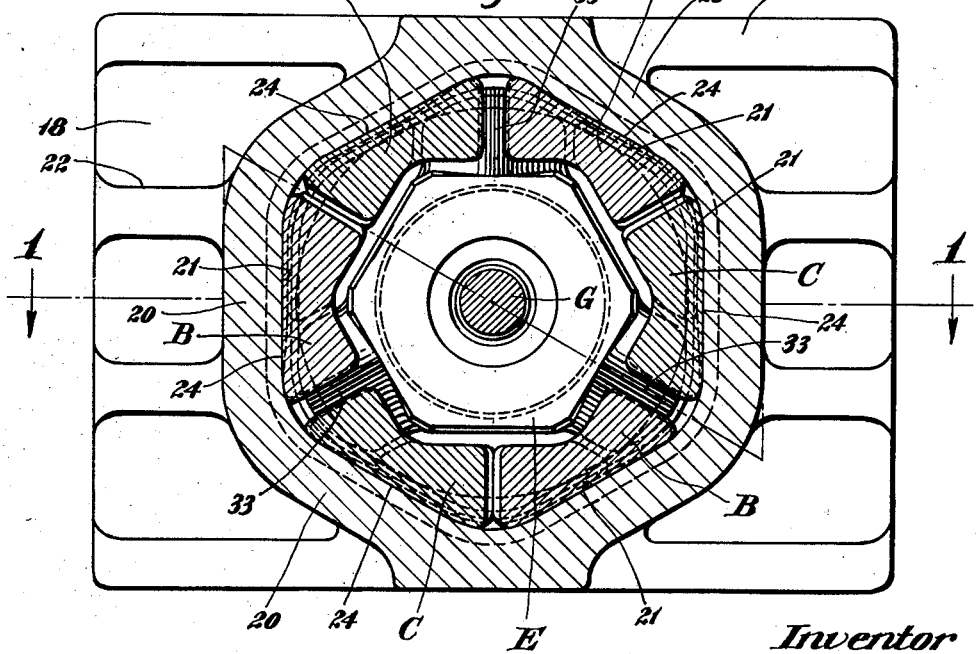
Inventor
Stacy B. Hasettine
By Henry Fuchs.
Atty.

Feb. 17, 1942.   S. B. HASELTINE   2,273,192
FRICTION SHOCK ABSORBING MECHANISM
Filed March 8, 1940   4 Sheets-Sheet 3

Inventor
Stacy B. Haseltine
By Henry Fuchs
Atty.

Feb. 17, 1942.   S. B. HASELTINE   2,273,192
FRICTION SHOCK ABSORBING MECHANISM
Filed March 8, 1940   4 Sheets-Sheet 4

Inventor
Stacy B. Haseltine
By Henry Fuchs.
Atty.

Patented Feb. 17, 1942

2,273,192

UNITED STATES PATENT OFFICE 2,273,192

FRICTION SHOCK ABSORBING MECHANISM

Stacy B. Haseltine, La Grange, Ill., assignor to W. H. Miner, Inc., Chicago, Ill., a corporation of Delaware Application March 8, 1940, Serial No. 322,997

12 Claims. (Cl. 213—32)

This invention relates to improvements in friction shock absorbing mechanisms.

One object of the invention is to provide a friction shock absorbing mechanism especially adapted for railway cars wherein high shock absorbing capacity and assured release are obtained by relatively movable friction means comprising a friction casing and a spring resisted friction clutch within the casing, wherein the friction clutch comprises an annular series of friction shoes and wedge spreading means for expanding said series of shoes to force the same into tight frictional contact with the casing, the parts of the clutch being so designed that extended contact on relatively large surface areas between the friction shoes and the casing is assured.

Another object of the invention is to provide a mechanism as specified in the preceding paragraph wherein the casing presents an annular series of substantially flat, interior friction surfaces and the shoes of the clutch member correspond in number to the casing surfaces and have flat friction surfaces engaging said casing surfaces, and wherein the wedge means comprises front and rear wedge members having respectively wedging engagement with the front and rear portions of the side edge ends of the shoes, the engagement of said front and rear wedges with each shoe being respectively on opposite side edges thereof, thus reducing to a minimum the number of wedge faces required on each wedge member.

A further object of the invention is to provide a friction shock absorbing mechanism comprising a friction casing having a tapered friction shell section presenting interior friction surfaces and a spring resisted friction clutch having sliding frictional engagement with the interior of said friction shell section, wherein the clutch comprises friction shoes and cooperating pressure transmitting means having wedging engagement with the shoes to expand said clutch, the arrangement being such as to produce relative rotary sliding movement of the shoes on the friction surfaces of the friction shell to augment the frictional resistance of the mechanism.

Other objects of the invention will more clearly appear from the description and claims hereinafter following.

Figure 5:
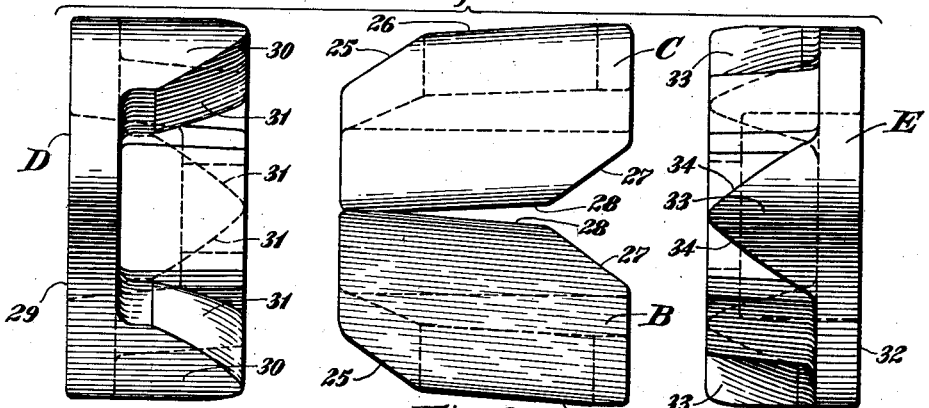
Figure 6:
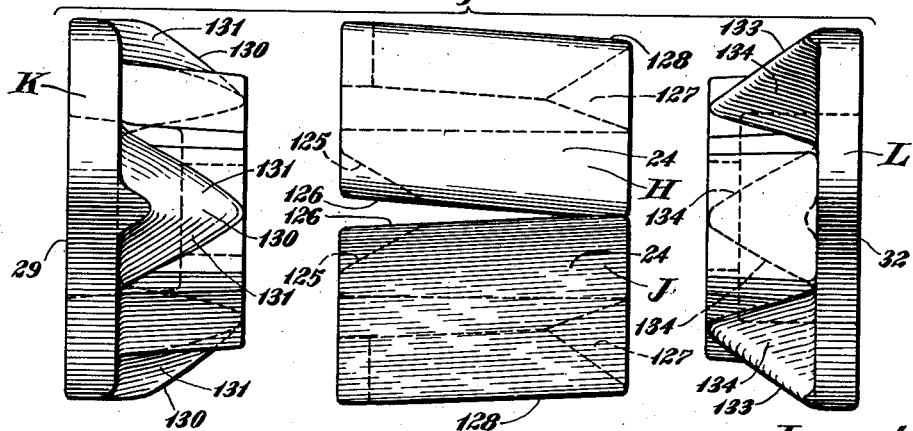
Figure 7:
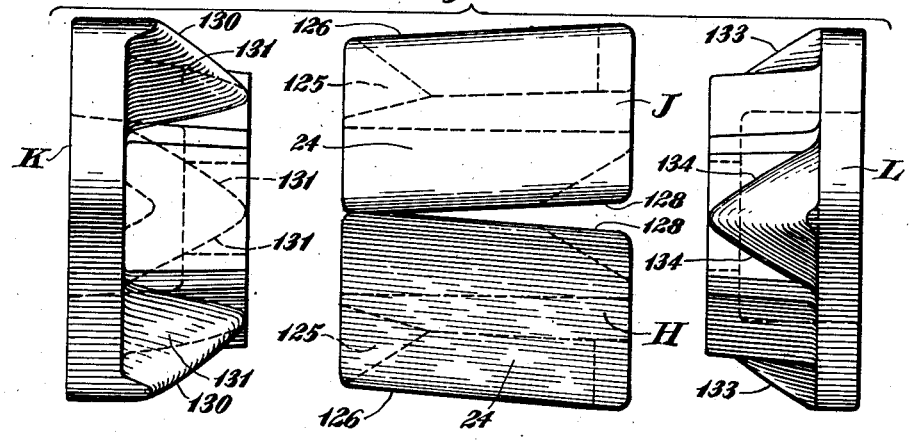
Figure 8:
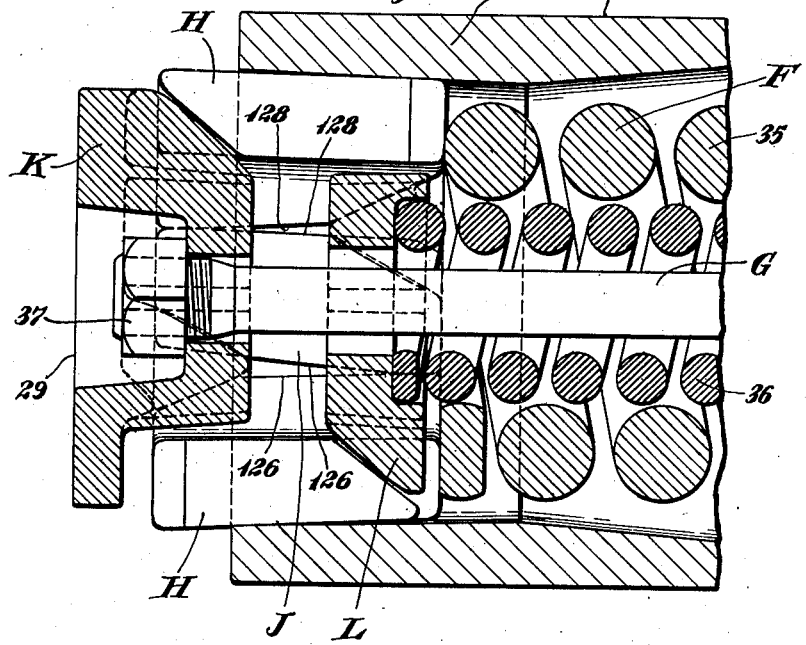

In the drawings forming a part of this specification, Figure 1 is a horizontal longitudinal sectional view through a portion of the underframe structure of a railway car, illustrating my improved shock absorbing mechanism in connection therewith, the section through the shock absorbing mechanism being on a plane at an angle to the horizontal plane of the mechanism, as indicated by the line I—I in Figure 3. Figure 2 is a transverse vertical sectional view of the friction shock absorbing mechanism only, corresponding substantially to the line 2—2 of Figure 1. Figure 2 is a transverse vertical sectional view of the friction shock absorbing mechanism only, corresponding substantially to the line 3—3 of Figure 1. Figure 4 is a side elevational view, on an enlarged scale, of the front and rear wedge members and two shoes of the friction clutch of the shock absorbing mechanism shown in Figures 1, 2, and 3, the wedge members and shoes being shown separated to more clearly illustrate the structure and design of the same. Figure 5 is a side elevational view, similar to Figure 4, the parts being rotatably displaced through an angle of 60° from the position shown in Figure 4. Figures 6 and 7 are views respectively similar to Figures 4 and 5, illustrating another embodiment of the invention. Figure 8 is a view similar to Figure 1 showing the front end of the shock absorbing mechanism only, and illustrating still another embodiment of the invention, said view being on an enlarged scale.

Referring first to the embodiment of the invention ilustrated in Figures 1 to 5 inclusive, 10—10 indicate channel-shaped center or draft sills of a railway car underframe structure provided with the usual front and rear stop lugs 11—11 and 12—12. The inner end portion of the shank of the usual coupler is indicated by 13, to which is operatively secured a hooded yoke 14. The improved shock absorbing mechanism proper is supported within the yoke, and the yoke in turn is slidingly supported on the usual saddle plate 15 secured to the bottom flanges of the draft sills. The draft sills are further provided with guide plates 16—16 for maintaining the shock absorbing mechanism properly centered between the sills. The usual front follower 17, which cooperates with the front stop lugs 11—11, in a well-known manner, is disposed within the yoke 14 and bears on the front end of the shock absorbing mechanism.

The improved shock absorbing mechanism shown in Figures 1 to 5 inclusive comprises broadly a friction casing A; three friction shoes B—B—B; three friction shoes C—C—C; a pressure transmitting wedge D; a spring follower wedge E; a spring resistance F; and a retainer bolt G.

The friction casing A is preferably in the form of a steel casting of hexagonal cross section, open at the front end and closed at the rear end by a transverse vertical wall 18, which is extended laterally outwardly beyond the opposite sides of the casing, thereby providing a rear follower member on said casing which is integral therewith and cooperates with the rear stop lugs 12—12 of the draft rigging in the manner of the usual rear follower. The six side walls of the hexagonal casing are indicated by 19—19. As shown most clearly in Figure 1, the side walls 19 are thickened at the front end of the casing and provide at said end a friction shell section 20. The interior sides of the walls of the friction shell section are substantially flat and converge inwardly of the casing, thus providing six interior friction surfaces 21—21 disposed symmetrically about the longitudinal central axis of the casing. The rear follower section of the casing, which is formed by the wall 18, may be suitably reenforced by longitudinally extending webs 22—22, as clearly indicated in Figure 1. The rear wall 18 is provided with an inwardly projecting, central, hollow boss 23 to which the retainer bolt G is anchored, as hereinafter pointed out.

The friction shoes are six in number, comprising three similar shoes B—B—B and three similar shoes C—C—C. The shoes B and C are of the same design, except as hereinafter pointed out. Each shoe has a longitudinally extending, flat friction surface 24 on the outer side thereof engaging with the corresponding friction surface 21 of the casing A. At the forward end, each shoe has one side edge thereof provided with an inclined wedge face 25, said side edge of said shoe being substantially straight rearwardly of the wedge face, as indicated by 26. At the rear end of said shoe, the opposite side edge thereof is provided with an inclined wedge face 27, said last named side edge being substantially straight forwardly of said wedge face 27, as indicated at 28. The shoes B and C differ only in that the wedge faces thereof are reversed with reference to the sides of said shoes, that is, the wedge faces 25—25 are respectively on opposite sides of the shoes B and C and the wedge faces 27—27 are respectively on the remaining two opposite sides of said shoes. The shoes B are alternated with the shoes C, whereby the straight side edge 26 and the wedge face 25 on said side edge of each shoe B face the straight side edge 26 and the wedge face 25 of the adjacent shoe C at one side of the shoe B, and the straight side edge 28 and the wedge face 27 of said shoe B face the straight side edge 28 and the wedge face 27 of the adjacent shoe C at the other side of said shoe B. The six shoes B—B—B and C—C—C thus present three sets of rearwardly converging, opposed wedge faces 25—25 at their forward ends and three sets of forwardly converging, opposed wedge faces 27—27 at their rear ends, said front and rear sets of wedge faces being staggered with respect to each other circumferentially of the casing. The shoes B and C have rocking bearing contact with each other at their forward ends on the edge faces 28—28 of the same, which are on the same sides thereof as the wedge faces 27—27, and have rocking bearing contact with each other at their rear ends on the edge faces 26—26 thereof, which are on the same sides as the wedge faces 25—25.

The pressure transmitting wedge D is in the form of a block having a flat, transverse, front end face 29 bearing on the inner side of the front follower 17 of the draft rigging. At the inner end the block D is provided with three radially arranged wedge portions or projections 30—30—30 which are equally spaced, being disposed at 120° to each other. Each projection 30 has wedge faces 31—31 at opposite sides thereof which converge rearwardly of the mechanism and have their meeting edges in a plane at right angles to the longitudinal central axis of the mechanism. Each wedge face 31 is crowned slightly in a direction lengthwise of the mechanism, to facilitate slight rocking of the shoes thereon. These wedge projections 30—30—30 of the block D engage respectively between the three sets of wedge faces 25—25 at the forward ends of the shoes and have the wedge faces 31—31 thereof, which are correspondingly inclined to the wedge faces 25—25, in wedging engagement with the corresponding set of said wedge faces 25—25.

The spring follower wedge E is in the form of a hollow cap having a rear end face 32 bearing on a member of the spring resistance F. At its front end, the cap E is provided with three radially extending wedge portions 33—33—33, which are equally spaced, being disposed at 120° to each other. Each projection 33 has wedge faces 34—34 on opposite sides thereof which converge forwardly of the mechanism and have their meeting edges in a plane at right angles to the longitudinal central axis of the mechanism. Each face 34 is preferably crowned slightly in a direction lengthwise of the mechanism to facilitate slight rocking of the shoes thereon. This spring follower wedge is so disposed that the wedge projections thereof are staggered with respect to the projections on the wedge block D and engage respectively between the wedge faces 27—27 of the three sets at the rear ends of the shoes and have said wedge faces 34—34 thereof, which are correspondingly inclined to the wedge faces 27—27, in wedging engagement with the corresponding set of said faces 27—27.

The shoes B—B—B and C—C—C, together with the wedge block D and the spring follower wedge cap E constitute a sliding friction clutch which cooperates with the interior friction surfaces 21—21 of the casing A.

The spring resistance F, which is disposed within the casing A, comprises a heavy outer coil spring 35 and a relatively lighter inner coil spring 36. These coil springs are interposed between the spring follower wedge cap E and the rear wall 18 of the casing A, the spring 35 bearing at its rear end on said wall 18 and at its forward end on the rear face of the cap E and the spring 36 bearing at its rear end on the boss 23 of the casing and having its front end extending into the opening of the spring follower cap E and bearing on the inner side of the front wall of said cap. The boss 23 extends into the rear end of the coil 35 and serves to center the same.

The retainer bolt G has the head thereof anchored to the boss 23 and extends through the inner coil 36 of the spring and the spring follower cap E, into the wedge block D, being anchored to the latter by a nut 37 at the outer end of the bolt, the block D being recessed to accommodate said nut. The retainer bolt limits expansion of the mechanism and holds the same of uniform overall length, and is so adjusted that said mechanism is held under slight initial compression.

The operation of the improved mechanism shown in Figures 1 to 5 inclusive is as follows:

Assuming a draft or pulling action applied to the coupler, the yoke is pulled outwardly therewith compressing the shock absorbing mechanism against the front follower 17, which at this time is held stationary by the front stop lugs 11—11. A buffing action applied to the coupler forces the front follower 17 rearwardly, compressing the shock absorbing mechanism against the rear stop lugs 12—12, the casing A of the shock absorbing mechanism being held stationary at this time by the rear follower section of said casing which engages the stop lugs 12—12. During compression of the mechanism in either buff or draft, the friction clutch, comprising the wedge block D, the shoes B—B—B and C—C—C, and the wedge spring follower cap E, is forced inwardly of the casing A against the resistance of the spring F, the block D being forced inwardly by relative movement of the casing A and the front follower 17. Due to the wedging engagement of the wedge block D and the spring follower cap E with the friction shoes B—B—B and C—C—C, the latter are forced apart circumferentially, thereby expanding the clutch and pressing the shoes tightly against the friction surfaces of the casing. As the clutch moves inwardly of the casing, the same is contracted due to the taper of the friction shell section of said casing, thereby squeezing the wedge D and the spring cap E outwardly lengthwise of the mechanism. Inasmuch as the wedge D engages the wedge faces 25—25 at the forward ends of the shoes and the shoes have rocking engagement with each other at their rear ends on their side edges 26—26, and the wedge cap E engages the wedge faces 27—27 at the rear ends of the shoes and the shoes have rocking engagement with each other at their front ends on their side edges 28—28, the shoes are forced to rotatably slide on the friction surfaces 21—21 of the casing as the clutch is contracted. Friction, in addition to the friction produced by the shoes sliding inwardly of the casing, is thus produced by the friction between the friction surfaces of the shoes and casing due to their rotary movement. This action continues until the actuating force is reduced, whereupon the expansive action of the spring F releases the mechanism, forcing the clutch comprising the friction shoes B—B—B and C—C—C, the wedge block D, and the spring cap E outwardly until movement of the wedge D is limited by the retainer bolt G, thereby restoring the parts to the normal full release position shown in Figure 1.

Referring next to the embodiment of the invention illustrated in Figures 6 and 7, the construction of the device is the same as that shown in Figures 1 to 5 inclusive, with the exception that the cooperating wedge faces of the elements of the friction clutch are of different design. In Figures 6 and 7 the friction shoes, which are indicated by H and J, have outer friction surfaces which correspond to the friction surfaces 24 of the shoes B and C hereinbefore described and are also indicated by 24. Each shoe H and J has straight, opposite, side edges 126 and 128, the shoes H and J of the annular series being alternated and so arranged that each shoe H has the edge 126 opposed to the edge 126 of the shoe J at one side thereof and the edge 128 opposed to the edge 128 of the shoe J at the other side of the same. The edges 126—126 of the shoes H and J contact at the rear ends of said shoes, and the edges 128—128 of said shoes have contact with each other at the front ends of said shoes.

The main or front wedge block shown in Figures 6 and 7, which corresponds to the wedge block D hereinbefore described, is indicated by K, and is provided with a flat front face which corresponds to the face 29 of the wedge D, and is also indicated by 29. The face 29 of the wedge K is adapted to bear on the front main follower of the draft rigging. At the rear end the wedge block K is provided with three radially extending wedge projections 130—130—130 which have rearwardly converging wedge faces 131—131 on opposite sides thereof, which are slightly crowned lengthwise of the mechanism to facilitate rocking of the shoes thereon. These wedge faces are also inclined rearwardly toward the central longitudinal axis of the casing, so that their meeting edges lie in planes at an acute angle to the longitudinal central axis of the casing. The wedge faces 131—131 engage with the wedge faces 125—125 on the shoes H and J, respectively, the wedge faces 125—125 being on the forward ends of the sides of the shoes which have the edge faces indicated by 126—126. The inclination of the faces 125—125 corresponds to that of the faces 131—131. The wedge faces 125—125 have wedging engagement with the wedge faces 131—131 to force the shoes apart at their forward ends.

The spring follower cap shown in Figures 6 and 7 corresponds to the cap E hereinbefore described, and is indicated by L. The cap L has three radially extending wedge projections at the forward end which are indicated by 133—133—133. Each wedge projection 133 has wedge faces 134—134 on opposite sides thereof which converge forwardly of the mechanism and are slightly crowned lengthwise of said mechanism to facilitate rocking of the shoes thereon. These wedge faces 134—134 are also inclined with respect to the longitudinal central axis of the mechanism so that their meeting edges lie in a plane at an acute angle to said longitudinal central axis. The wedge faces 134—134 engage with correspondingly inclined wedge faces 127—127 at the rear end of the shoes H and J on the sides thereof which have the edge faces 128—128.

The operation of the clutch disclosed in Figures 6 and 7 is the same as that of the clutch shown in Figures 1 to 5 inclusive with the exception that, in addition to wedging the shoes apart circumferentially, the wedge projections of the block K and the spring cap L wedge the shoes radially outwardly away from the central longitudinal axis of the casing.

Referring next to the embodiment of the invention shown in Figure 8, the construction is identical with that disclosed in Figures 1 to 5 inclusive, with the exception that the clutch is modified as shown in Figures 6 and 7 and the shoes are directly resisted by one member of the spring resistance and the spring follower cap is resisted by the other member of said spring resistance. The wedge block, shoes, and spring follower cap of the clutch element are indicated by the same reference characters used in Figures 6 and 7, and are of the same identical design as the corresponding parts shown in Figures 6 and 7, except as hereinafter pointed out. The friction casing and the spring resistance correspond to the casing A and the spring resistance F hereinbefore described, and are also indicated by A and F, respectively, and corresponding parts of said casing are indicated by the same reference characters as used in Figures 1 to 5 inclusive. As disclosed in Figure 8, the shoes H and J are extended rearwardly beyond the spring follower cap L so that they bear directly on the outer coil 35 of the spring resistance F. The inner coil 36 of said spring resistance bears on the spring follower cap L which is in wedging engagement with the shoes H and J. The entire resistance of the spring resistance F, which opposes inward movement of the clutch, is thus not employed in wedging the spring follower cap against the shoes, but said resistance is so distributed that the greater portion thereof is used to directly oppose movement of the shoes. With the exception that the yielding resistance to the clutch is distributed so that only a portion thereof acts on the spring follower cap, the operation of the device shown in Figure 8 is the same as the operation of the device shown in Figures 1 to 5 inclusive, and of the device shown in Figures 6 and 7.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction casing having inwardly converging friction surfaces; of a sliding friction clutch within said casing, said clutch including an annular series of friction shoes and front and rear wedge blocks, each friction shoe having rocking engagement at its forward end with the shoe adjacent one side thereof and rocking engagement at its rear end with the shoe at the other side thereof, said front wedge block having wedge means thereon having wedging engagement between the sides of the front ends of adjacent shoes which have rocking engagement with each other at their rear ends and said rear wedge block having wedge means thereon having wedging engagement between the sides of the rear ends of adjacent shoes which have rocking engagement with each other at their front ends; and yielding means resisting inward movement of said clutch.

2. In a friction shock absorbing mechanism, the combination with a friction casing; of a sliding friction clutch within said casing, said clutch including an annular series of friction shoes, and front and rear wedge blocks, said shoes comprising a plurality of adjacent sets of shoes, each set comprising an adjacent pair of shoes, the adjacent side edges of the shoes of adjacent sets converging from the front to the rear ends thereof and being in rocking engagement at their rear ends, and the adjacent side edges of the shoes of each pair diverging from the front to the rear ends thereof and being in rocking engagement at their front ends, said front and rear wedge blocks each having a plurality of wedge projections, said wedge projections of said front and rear blocks being staggered with respect to each other, said wedge projections of said front wedge block engaging between adjacent sets of shoes and said wedge projections of said rear wedge block engaging between the shoes of each pair; and means yieldingly resisting inward movement of said clutch.

3. In a friction shock absorbing mechanism, the combination with a friction casing having a plurality of interior inwardly converging friction surfaces arranged about the longitudinal axis of the mechanism; of an annular series of friction shoes corresponding to the number of friction surfaces and having sliding frictional engagement respectively therewith, said shoes comprising a plurality of adjacent pairs of shoes; a front wedge block having a plurality of wedge projections, each wedge projection engaging between two adjacent pairs of shoes at the forward ends thereof to force the same apart; a rear wedge block having a plurality of wedge projections, each wedge projection of said rear wedge block engaging between the shoes of one of said pairs at the rear ends thereof, said shoes of each pair being in rocking engagement with each other at their front ends, the adjacent shoes of adjacent pairs being in rocking engagement with each other at their rear ends; and spring means opposing inward movement of said shoes.

4. In a friction shock absorbing mechanism, the combination with a hexagonal friction casing having six flat interior friction surfaces; of a clutch comprising an annular series of six friction shoes within the casing, each shoe having a flat surface in sliding frictional engagement with one of said casing surfaces, one side edge of said shoe contacting at the rear of the clutch with the adjacent shoe, said side edge diverging forwardly away from the opposed side edge of said adjacent shoe, and the other side edge of said shoe contacting, at the front end of the clutch, with the shoe adjacent said last named side edge and diverging rearwardly from the front to the rear of the clutch, a front wedge block having three rearwardly converging, circumferentially spaced wedge projections, and a rear wedge block having three forwardly converging, circumferentially spaced wedge projections, said wedge projections of said front and rear wedge blocks being alternated with respect to each other, and having wedging engagement between adjacent shoes of said annular series alternately at the front and rear ends of said clutch; and means yieldingly resisting inward movement of said clutch.

5. In a friction shock absorbing mechanism, the combination with an inwardly tapered friction casing of hexagonal interior cross section presenting six flat interior friction surfaces; of an annular series of six friction shoes, each friction shoe having sliding frictional engagement with one of said casing friction surfaces, adjacent of said shoes at three alternate corners of said casing having fulcruming edge contact with each other remote from their rear ends, and adjacent of said shoes, at the three remaining alternate corners of said casing, having fulcruming edge contact with each other rearwardly of the location of the fulcruming contact of said shoes at said first named alternate corners; a front wedge member having three wedge projections engaging between adjacent shoes at said second named alternate corners forwardly of the locations of the fulcruming edge engagement of the adjacent shoes at said second named corners; a rear wedge member having three wedge projections engaging between the adjacent shoes at said first named corners rearwardly of the locations of the fulcruming edge engagement of the adjacent shoes at said first named corners; and spring means opposing inward movement of said shoes and rear wedge member.

6. In a friction shock absorbing mechanism, the combination with a friction casing having an inwardly tapering friction shell section; of a friction clutch within said casing comprising an annular series of friction shoes and front and rear wedge blocks, said shoes and, said shell section of the casing having cooperating friction surfaces, each shoe having a wedge face on one of its side edges at the forward end thereof and a second wedge face on the opposite side edge at the rear end thereof, each shoe having rocking engagement at the rear thereof on said first named side edge with the shoe adjacent said side edge and rocking engagement at the front thereof on said second named side edge with the shoe adjacent said side edge, adjacent shoes being spaced apart at said wedge faces of the front and rear ends said front and rear wedge blocks having wedging engagement respectively with said wedge faces at the front and rear ends of the shoes; and means yieldingly opposing inward movement of said clutch.

7. In a friction shock absorbing mechanism, the combination with a friction casing having inwardly converging interior friction surfaces; of a sliding friction clutch within said casing, said clutch including an annular series of friction shoes having sliding frictional engagement with the friction surfaces of the casing, and front and rear wedge blocks, each friction shoe having rocking engagement at its forward end on one side thereof with the shoe adjacent said side and being spaced at its front end from the shoe at the other side thereof, said same shoe having rocking engagement at its rear end with the shoe at said other side thereof, and being spaced at said rear end from the shoe at said first named side said front wedge block having a plurality of sets of wedge faces thereon, the faces of each set converging rearwardly of the mechanism and having their edges meeting in a plane at right angles to the longitudinal central axis of the mechanism, said sets of faces having respectively wedging engagement between the sides of adjacent shoes which have rocking engagement with each other at their rear ends, and said rear wedge block having wedge means thereon having wedging engagement between the sides of adjacent shoes which have rocking engagement with each other at their front ends; and yielding means resisting inward movement of said clutch.

8. In a friction shock absorbing mechanism, the combination with an inwardly tapered friction casing having an annular series of interior, flat friction surfaces; of an annular series of friction shoes, said shoes having flat friction surfaces in sliding contact respectively with the friction surfaces of the casing, each shoe at its front end being in lateral rocking bearing engagement with the adjacent shoe at one side thereof and being spaced laterally from the adjacent shoe at the other side thereof, and at its rear end having lateral rocking bearing engagement with the shoe at said last named side thereof and being spaced laterally from said shoe on the first named side thereof; wedge means engaged in the spaces between said shoes at the front ends thereof for spreading the same apart; wedge means for yieldingly holding the laterally spaced rear ends of the shoes apart; and means yieldingly opposing inward movement of all of said shoes.

9. In a friction shock absorbing mechanism, the combination with a friction casing having inwardly converging interior friction surfaces; of a friction clutch within the casing having sliding frictional engagement with said friction surfaces, said clutch including a wedge member, a pair of shoes, one on each side of said wedge member, and additional shoes at opposite sides of said pair of shoes, the shoes of said pair having rocking engagement with each other, said shoes of said pair being spaced apart forwardly of the point of rocking engagement thereof, and each shoe of said pair having rocking engagement with the adjacent additional shoe at a location nearer the outer ends of said shoes of said pair than the location of rocking engagement between the shoes of said pair, said additional shoe being spaced from said shoe of said pair rearwardly of the point of rocking engagement thereof, said wedge member having wedging engagement between the shoes of said pair to spread the same apart at their outer ends.

10. In a friction shock absorbing mechanism, the combination with a casing having inwardly converging interior friction surfaces; of a friction clutch within the casing having sliding frictional engagement with said friction surfaces, said clutch including a wedge member, a pair of friction shoes, one on each side of the wedge member and additional shoes, at opposite sides of said pair of shoes, the shoes of said pair having rocking engagement with each other at a location inwardly of the front ends of said shoes and being spaced apart forwardly of said point of rocking engagement, said wedge member having wedging engagement between said shoes of said pair forwardly of said location of rocking engagement therebetween, each shoe of said pair having rocking engagement with the adjacent additional shoe at a location nearer the outer ends of said shoes of said pair than the location of rocking engagement between the shoes of said pair; wedge means engaged between said additional shoes and the adjacent shoes of said pair at a location rearwardly of the location of rocking engagement between said additional adjacent shoes and said pair of shoes and holding the same spaced apart rearwardly of said location of rocking engagement; and means yieldingly resisting inward movement of said clutch.

11. In a friction shock absorbing mechanism, the combination with a friction casing having inwardly converging friction surfaces; of an annular series of friction shoes having sliding frictional engagement with the friction surfaces of the casing, said shoes being arranged in adjacent pairs, the shoes of each pair having rocking engagement with each other localized at their adjacent side edges rearwardly of the front ends of said shoes, each shoe of each pair having rocking engagement with the adjacent shoe of the adjacent pair localized on the adjacent side edges of said last named shoes forwardly of the location of rocking engagement between the shoes of said pair; front wedge means engaging between the adjacent shoes of each pair forwardly of the location of rocking engagement between said shoes; rear wedge means engaging between one of the shoes of each pair and the adjacent shoe of the next adjacent pair rearwardly of the location of rocking engagement between said shoes of adjacent pairs; and means yieldingly opposing inward movement of said rear wedge means.

12. In a friction shock absorbing mechanism, the combination with an inwardly tapered friction casing; of a sliding friction clutch within said casing movable inwardly thereof, said clutch comprising wedge means at the front and rear ends thereof and a plurality of mutually adjacent friction shoes arranged in annular series, adjacent shoes having rocking engagement with each other along their adjacent side edges, the zone of rocking engagement of each of said shoes with the adjacent shoe at one side thereof being offset lengthwise of the mechanism with respect to the zone of rocking engagement between the same and the adjacent shoe at the other side thereof, the wedge means at the front end of the clutch having wedging engagement between the sides of the adjacent shoes which have their zones of rocking engagement furthest removed from the front ends of said shoes, said wedging engagement being forwardly of said zone and the wedge means at the rear end of the clutch engaging between the sides of the adjacent shoes which have the zone of rocking engagement furthest removed from the rear ends of said shoes, said last named wedging engagement being rearwardly of said last named zone; and means yieldingly resisting inward movement of said clutch.

STACY B. HASELTINE.